United States Patent [19]

Gilliam et al.

[11] Patent Number: 4,663,098

[45] Date of Patent: May 5, 1987

[54] METHOD OF MANUFACTURING HIGH PERFORMANCE FLAT CABLE

[75] Inventors: Kenneth R. Gilliam, Clearwater; Raymond J. Look, Largo; Richard E. Thurman, Seminole, all of Fla.

[73] Assignee: AMP Incorporated, Harrisburg, Pa.

[21] Appl. No.: 716,711

[22] Filed: Mar. 27, 1985

[51] Int. Cl.[4] ........................ B29C 47/02; B29C 53/52

[52] U.S. Cl. ........................................ 264/104; 29/856; 29/828; 29/DIG. 47; 174/36; 174/117 F; 264/174; 264/285; 264/339; 425/112; 425/113; 425/114

[58] Field of Search ............... 264/104, 174, 285, 339; 425/114, 112, 113; 174/36, 117 F; 29/856, 828, DIG. 47

[56] References Cited

U.S. PATENT DOCUMENTS

| | | | |
|---|---|---|---|
| 2,628,998 | 2/1953 | Frisbie | 425/114 |
| 2,848,751 | 8/1958 | Vernon | 264/285 |
| 3,600,802 | 8/1971 | Jorgensen et al. | 264/285 |
| 3,775,552 | 11/1973 | Schumacher | 174/105 R |
| 3,897,187 | 7/1975 | Mole | 425/114 |
| 4,221,756 | 9/1980 | Piper et al. | 264/174 |
| 4,295,812 | 10/1981 | Hoddinott | 264/174 |
| 4,341,509 | 7/1982 | Harlow | 264/174 |
| 4,404,424 | 9/1983 | King et al. | 174/34 |
| 4,487,992 | 12/1984 | Tomita | 174/36 |
| 4,488,125 | 12/1984 | Gentry et al. | 331/1 |

FOREIGN PATENT DOCUMENTS

| | | | |
|---|---|---|---|
| 3114852 | 11/1982 | Fed. Rep. of Germany | 264/174 |
| 3116763 | 4/1983 | Fed. Rep. of Germany | 264/174 |

*Primary Examiner*—Jeffery Thurlow
*Attorney, Agent, or Firm*—Robert W. Pitts; Eric J. Groen

[57] ABSTRACT

A method of manufacturing high performance cable having a low profile configuration is disclosed. The method includes the steps of drawing, through an extrusion press, conductor subassemblies each including spaced, parallel, insulated wire pairs surrounded by an intermediate insulator. Prior to extrusion, conductive EMI shields are formed in-line around the subassemblies. The method also includes the step of extruding an insulating body around spaced, parallel pairs of shielded subassemblies with the wires in a common plane.

19 Claims, 11 Drawing Figures

METHOD OF MANUFACTURING HIGH PERFORMANCE FLAT CABLE

BACKGROUND OF THE INVENTION

1. Field of the Invention

This invention relates to a method of manufacturing high performance cable having a low profile configuration including the steps of drawing conductor subassemblies formed of insulated wire pairs surrounded by an intermediate insulator, through an extruder; forming conductive shields around the subassemblies prior to the extrusion; and extruding an exterior insulator around the shielded subassemblies.

2. Description of the Prior Art

Conventional multiconductor cables for transmitting high frequency electrical signals include both shielded twisted pair cables and coaxial cables. Such cables have their greatest utility in transmitting electrical signals between components of electrical systems. Such transmitted signals are normally in digital form although such transmitted signals may also be in analog form.

Shielded twisted pair cables utilize a pair of insulated conductive wires in a twisted pair configuration with a grounded, electrically conductive shield around each twisted wire pair. The shield functions to reduce electromagnetic interference radiation, generally called EMI, which naturally emanates from signal transmitting wires and which might otherwise adversely affect the performance of adjacent electronic devices. Such shield also functions to minimize cross talk, electrical interference between one pair of wires and an adjacent pair which would tend to impair the fidelity of the signals being transmitted. Shielded twisted pair cables can be used in a differential transmission system where both wires are electrically powered and both constitute signal carrying wires. The information transmitted is a function of the sequential voltage differential between the two wires of the pair. An example of a shielded twisted pair cable is described in U.S. Pat. No. 4,404,424 issued to King et al.

Coaxial cables also use an EMI shield to reduce radiation. But in coaxial cables, unlike shielded twisted pair cables, only one electrically powered signal wire is utilized. The signal wire is encased in insulation which is surrounded, in turn, by the grounded, electrically conductive shield. In coaxial cables, the shield also functions as a grounded reference for the voltage of the signal wire. An example of a coaxial cable is described in U.S. Pat. No. 3,775,552 issued to Schumacher.

Considerable effort has been extended to develop a flat coaxial cable which would yield the same performance characteristics as conventional coaxial cable but which would also enable the use of conventional mass stripping and termination techniques to thus facilitate the coupling of an electrical connector to the cable. Consider for example U.S. Pat. No. 4,488,125 to Gentry et al. Other flat coaxial cables are disclosed in U.S. Pat. Nos. 4,487,992 and 3,775,552.

One application for flat cable is in under the carpet wiring situations in which a flat, low profile cable is extended beneath a carpet for connection to, and coupling of, components of an electrical system such as a computer system or the like. Shielded twisted pair cables do not have a low profile suited for use in undercarpet applications since twisted wires are continuously and sequentially located above, to one side, below, and to the other side of each other along the length of the cable. As a result, the cable thickness periodically increases to a double wire thickness along the length of the cable. This arrangement of signal wires thus precludes low profile cable configurations since low profile cable configurations are possible only in cables having their wires spaced parallel to each other in a single, usually horizontal, plane. The configuration and orientation of wires in a shielded twisted pair cable also precludes mass stripping and termination since the positioning of any one wire with respect to another varies as a function of where the cable is cut along its length.

While many methods of manufacturing electrical cables have been proposed in the past, the instant method is particularly well-suited for the manufacturing of a flat high performance cable, equivalent in performance to a shielded twisted pair cable.

SUMMARY OF THE INVENTION

The preferred embodiment of the instant invention comprises a method of fabricating a flat cable for transmitting high frequency electrical signals without significant radiation along the length of the cable. The method includes the steps of drawing at least one conductor subassembly through the die of an extrusion press. Each subassembly contains a pair of insulated conductive wires which are spaced and parallel with respect to one another. An electrically conductive shield is then formed around each subassembly prior to their movement through the die. An insulator is then extruded therearound during their movement through the die. More specifically, the present invention includes the steps of fabricating a low profile flat cable for transmitting electrical signals equivalent to round shielded twisted pair cables. The steps of the method include first forming conductor subassemblies and then drawing the two conductor subassemblies through the die of an extrusion press. Each subassembly contains a pair of insulated conductive wires which are spaced and parallel with respect to one another. An electrically conductive shield is then formed around each subassembly prior to their movement through the die. The subassemblies are held spaced from each other and in an essentially horizontal plane with the wires of the subassemblies also in an essentially horizontal plane as they are drawn through the die. An insulator is then extruded around the shields as they pass through the die. Each subassembly is supported on a separate supply reel and the shield material is supported in flat foil form on additional reel means. The finished cable is drawn through the die of the extrusion press by a power driven take up reel. Each shield is formed from a flat foil configuration, to an essentially cylindrical configuration surrounding the subassemblies, prior to passage through the die of the extrusion press. The forming of each shield includes the steps of bending the flat foil into an essentially U-shaped configuration by pulling the flat foil through apertures in die or forming-blocks and then sequentially rolling the ends of the U-shaped foil into contact with each other to surround the subassembly by pulling the U-shaped foil through a series of sequential rollers. The step of feeding a subassembly to the foil is performed before its passage to the final forming-block. The bending is accomplished by pulling the flat foil through a V-shaped die in a first forming-block and then a U-shaped die in a second forming block. The U-shaped foil supports a subassembly prior to movement into the sequential rollers with the curved portion of the U-shaped foil and subassembly located facing downwardly and with the ends of the U-shaped foil and a flat surface of the subassembly facing upwardly. The sequential rollers include first rollers to contact and bend one upstanding leg of the U-shaped foil into contact with the flat face of the subassembly and the second rollers then bend the second upstanding leg into contact with the first upstanding leg of the U-shapes foil to thereby completely surround the subassembly. The subassembly and shield fed from the sequential rollers is rotated 90 degrees before feeding it to the die of the extruder. The path of travel of the subassembly and foil is essentially a straight line from the forming-blocks to beyond the extruder. Prior to the passage of the foil to the forming-blocks, the foil is preferably coated with a lubricant.

DESCRIPTION OF THE PREFERRED EMBODIMENT

The multilayer shielded pair cable to be manufactured in accordance with the teachings of this invention provides a controlled, impedance, low attenuation balanced multiconductor flat cable suitable for use in transmitting digital or other high frequency signals. The cable will be described in terms of a flat conductor cable having two separate pairs of associated wire conductors, four conductors in all. It should be understood, however, that some applications may require cable having more than just two pairs of conductors. This invention is consistent with the use of any number of pairs of conductors and can be employed with a single pair of conductors or with a large number of pairs. Indeed, this invention is intended for use in applications requiring three or more pairs of conductors or even one pair in a manner similar to the use of the two-pair cable.

Figure 1:
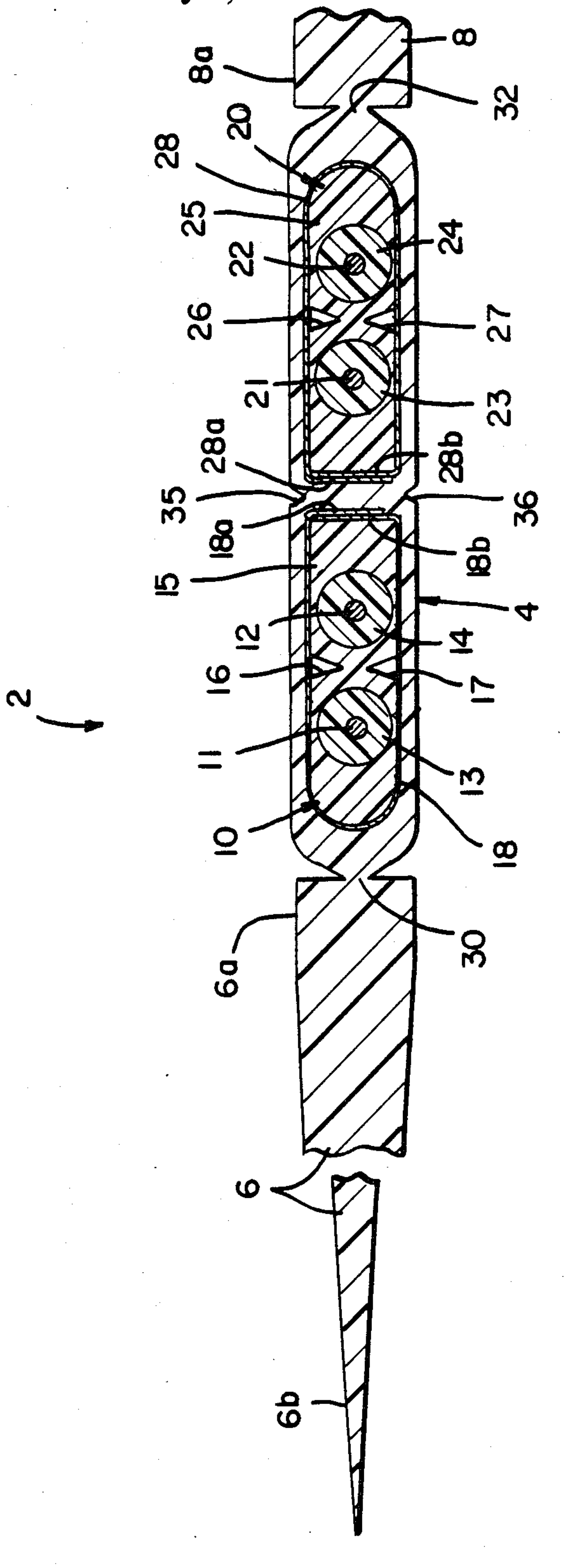
FIG. 1 is a cross-sectional view of a two-pair flat cable with high performance characteristics manufactured in accordance with the teachings of the present invention.

As can be seen in the drawings, particularly with reference to FIG. 1, the cable is fabricated with a common symmetrical cross-sectional profile along its entire length. By virtue of weakened sections 30 and 32 and inherent flexibility it can rest on the floor in a flat condition no matter which side is placed on the floor.

The cross-sectional configuration shown in FIG. 1 demonstrates the relative positioning of four wire conductors 11, 12, 21 and 22 in a flat cable assembly 2. Each of the conductors 11, 12, 21 and 22 employed in the preferred embodiment of this invention comprises a conventional round wire conductor. Conductors 11 and 12 comprise one associated pair of conductors while conductors 21 and 22 comprise a similar pair of associated conductors. Although each of the conductors 11, 12, 21 and 22 is positioned in the same plane, thus facilitating the low profile necessary for use in undercarpet installations, the two conductor pairs are nevertheless electrically balanced. Both of the conductor pairs are embedded in an outer insulating body 4 which comprises the central longitudinally extending portion or region of the cable 2. Similarly-shaped wings or ramps 6 and 8 are bonded longitudinally along the opposite sides of the central body 4. Each of the wings 6 and 8 comprises an inclined surface to provide a smooth transition laterally of the axis of the cable, thus eliminating any sharp bump when the cable is positioned beneath a carpet. In the preferred embodiment of this invention, the insulating ramps 6 and 8 are formed from the same material as the insulating material which forms insulating body 4. Wings 6 and 8 are joined to body 4 along weakened longitudinally extending sections 30 and 32. In the preferred embodiment of this invention, the insulating material forming the body 4 and the insulating material forming wings 6 and 8 comprises an extruded insulating material having generally the same composition. A conventional polymer such as polyvinyl chloride, PVC, insulation comprises one material suitable for use in the jacket or body 4 in the wings 6 and 8.

The surfaces or faces of the opposed central regions of the cable are parallel to each other. A continuation of such parallelism extends to a limited degree into the wings of the cable. This extending of the parallelism into the wings provides for an extended thicker, horizontal section of the cable between the tapered regions of the wings when the cable is placed on the floor beneath a carpet. This design has been found to further distribute the forces from the carpet through the cable to the floor uniformly and reduce the external forces which would otherwise detrimentally act upon the wires and shield within the cable. As can be seen in FIG. 1, the transverse profile of the cable is low, and it is symmetric about both its central horizontal plane and its central vertical plane so that it may be employed with either face up reducing the chance for operator error during installation.

The opposed faces of the central region of the body are essentially flat and are as thin as possible consistent with known fabrication techniques while allowing for the high electrical performance of the cable. In the preferred embodiments of the invention this greatest thickness does not exceed 80 mils. The width of the cable should be of such a dimension so that when employed under a carpet it will allow a smooth transition from the floor to the center of the cable and then thereacross. The presence of the cable should not be discernible. A preferred dimension for the width of the cable has been found to be about 2.000 inches. Such dimension will allow the above described smooth transition but will not enlarge the taper of the wings to the extent of being wasteful of material constituting their body.

Each shielded cable pair is separately embedded within the insulating body 4. As shown in FIG. 1, the conductors 21 and 22 forming one pair 20 of associated conductors are surrounded or embedded within a separate insulating core 25 which is, in turn, embedded within the body 4 of cable 2. Each conductor 21 and 22 is, however, surrounded by a first insulation 23 and 24 respectively which comprises a foam-type insulation havng a relatively low dielectric constant. An elastomeric, foamable insulation such as polypropylene or polyethylene, or any like material which can be fabricated with a large percentage of air trapped within the material, comprises a suitable dielectric material for use around the conductors in areas of relatively high dielectric field.

The cylinders of insulation 23 and 24 for the conductors are preferably extruded around the conductors. The extrusion material is preferably polyethylene resin with a predetermined percentage of a foaming agent blended with the polyethylene to be heated and extruded. It is the foaming agent which forms the air within the extruded product when subjected to heat and pressure. In accordance with known extrusion techniques, the materials, their compositions and proportions, the heat and speed of extrusion, the post-extrusion quenching, etc. are selected so as to form the insulation around the wire to exact dimensional tolerances and as a closed cell foam with about 40 to about 60 percent air by volume. It has been found that the maximum amount of air within the dielectric will improve the electrical performance of the system. However, excess air beyond the range as identified herein may degrade the dimensional stability and integrity of the foam.

Following the fabrication of the insulation surrounding the conductors, and prior to the performing of additional processing steps thereon, the individual insulating wires are preferable striped or otherwise marked with discrete, visually identifiable indicia such as a color coding. Indicia, such as a helical color coded stripe along the length of the insulator on its exterior surface allows for visual differentiation of the various wires of the cable as during termination and coupling of the cable wires to an electrical component such as a connector. In this manner, when the final cable is stripped in association with a termination process, the proper wires of the cable may be coupled with the proper element of the connector or the like.

These foam-covered conductors may then be embedded within an insulating material 25, as by extrusion, which completely surrounds the foam insulation 23 and 24 in the immediate vicinity of the conductors. The insulating material 25 need not have as low a dielectric constant as the foam insulation 23 and 24, since the insulating material 25 is located in areas of relatively lower electric fields. The insulating material 25 must, however, be suitable for imparting dimensional stability and integrity to conductors 21 and 22 as well as to their surrounding insulation 23 and 24. In fact, in this invention the dielectric material 25 holds the conductors 21 and 22 in a parallel configuration along precisely spaced surfaces, edges and center lines with respect to the cable and with respect to each other. The insulating material forming the core 25 also comprises a material having greater strength when subjected to compressive forces than the foam type insulation 23 and 24 surrounding conductors 21 and 22. A material suitable for forming core 25 is preferably a conventional flexible polyvinyl chloride, PVC, which can be extruded around the foam insulation 23 and 24 surrounding conductors 21 and 22. It is desirable that the foam type insulation 23 and 24 not adhere to the extruded insulating material forming the core 25 to facilitate separation of the conductors from the core 25 for conventional termination into a connector.

Longitudinally extending notches 26 and 27 are defined along the upper and lower surfaces of the core 25. These notches, which can be conveniently formed as part of the extrusion process through the appropriate design of the die are located in areas of relatively low dielectric field and define a weakened section of insulating core 25 to permit separation of conductors 21 and 22 for termination purposes. Formed into the upper and lower surfaces of the body 4 are central notches 35 and 36 extending the length of the core along the centerline. These central notches are naturally formed during the cooling process following the extrusion since a greater quantity of shrinkable PVC is located in the body 4 between the upper and lower notches as compared with the quantity of insulator immediately to either side thereof.

Figure 4:
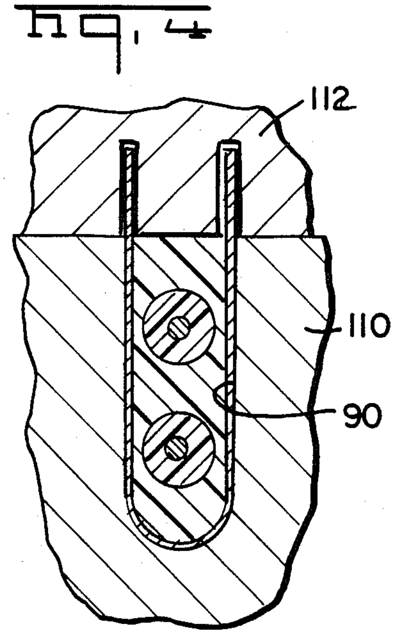
FIGS. 4 through 11 are cross-sectional views of a shield and subassembly in various stages of formation taken along lines 4—4 through 11—11 of FIG. 3.

The electrical performance of each pair of conductors is greatly enhanced by the use of EMI shields 18 and 28 encircling the cores 15 and 25 of the conductors within each conductor pair 10 and 20. As shown in FIG. 4, and EMI shield 28 can be positioned in partially encircling relationship to conductors 21 and 22 within insulating core 25. The ends 28A and 28B of EMI shield extend beyond the lateral edge of core 25 during fabrication of the cable.

Figure 2:
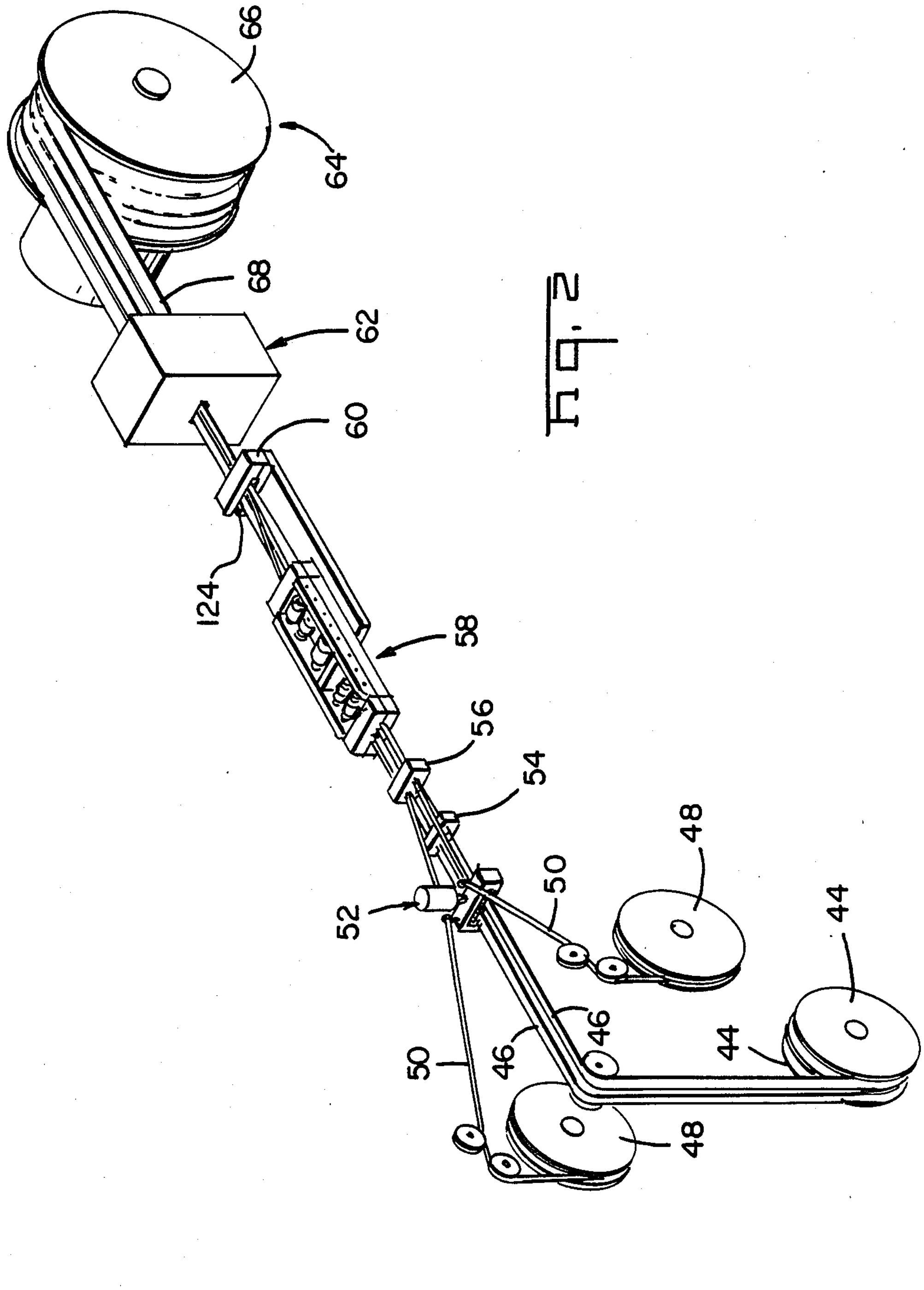
FIG. 2 is a perspective showing of an assembly line employing apparatus for carrying out the process steps for manufacturing electrical cable in accordance with the teachings of the present invention.

Reference is now made to FIG. 2 which illustrates machinery capable of carrying out the method of fabricating or manufacturing the cable as disclosed herein. The invention anticipates the utilization of separate supply reels 44 for supporting flat, electrically conductive strips 46, such as of copper, for the forming of the EMI shields. Separate supply reels 48 are also provided, each being adapted to support a supply of the two conductor subassemblies 50.

Each subassembly is formed of two laterally spaced conductive wires surrounded separately by the first, or internal, insulating material which is preferably a closed cell polyethylene foam. The polyethylene foam may be extruded onto the wires in a conventional manner. The insulating wires may then be fed in separated pairs through an extrusion die, also in an essentially conventional manner, to form the two conductor subassemblies shown on the supply reels of FIG. 2 and within the EMI shield of FIG. 1.

FIG. 2 is an overview of the apparatus employed in carrying out the method of the present invention. It is adapted to bring together separate strips of copper from the two foil supply reels and the pair of two conductor subassemblies from their two supply reels. The arrangement of components of the apparatus is such as the position the subassemblies and strips for proper orientation along their paths of movement for final extrusion of the cable body material around the subassemblies and surrounding shields and for final take up to create the finished cable.

In addition to the various supply reels at the supply station, the significant functioning components of the fabrication system, along the path of travel of the workpiece, include the oiler 52 for lubricating the flat copper foil strips; the V-shaped die or former-block 54 for shaping the copper strips; the U-shaped die or former-block 56 for shaping the copper strips with a conductor subassembly 50 contained therein; the rolling mill station 58 for the final shaping of the copper strips into the EMI shields the orienting block 60 for the pre-extrusion positioning of the EMI shields and their surrounded subassemblies; the extrusion press 62 and the receiving station 64 including the power driven take up reel 66 for receiving the finished cable 68.

Figure 3:
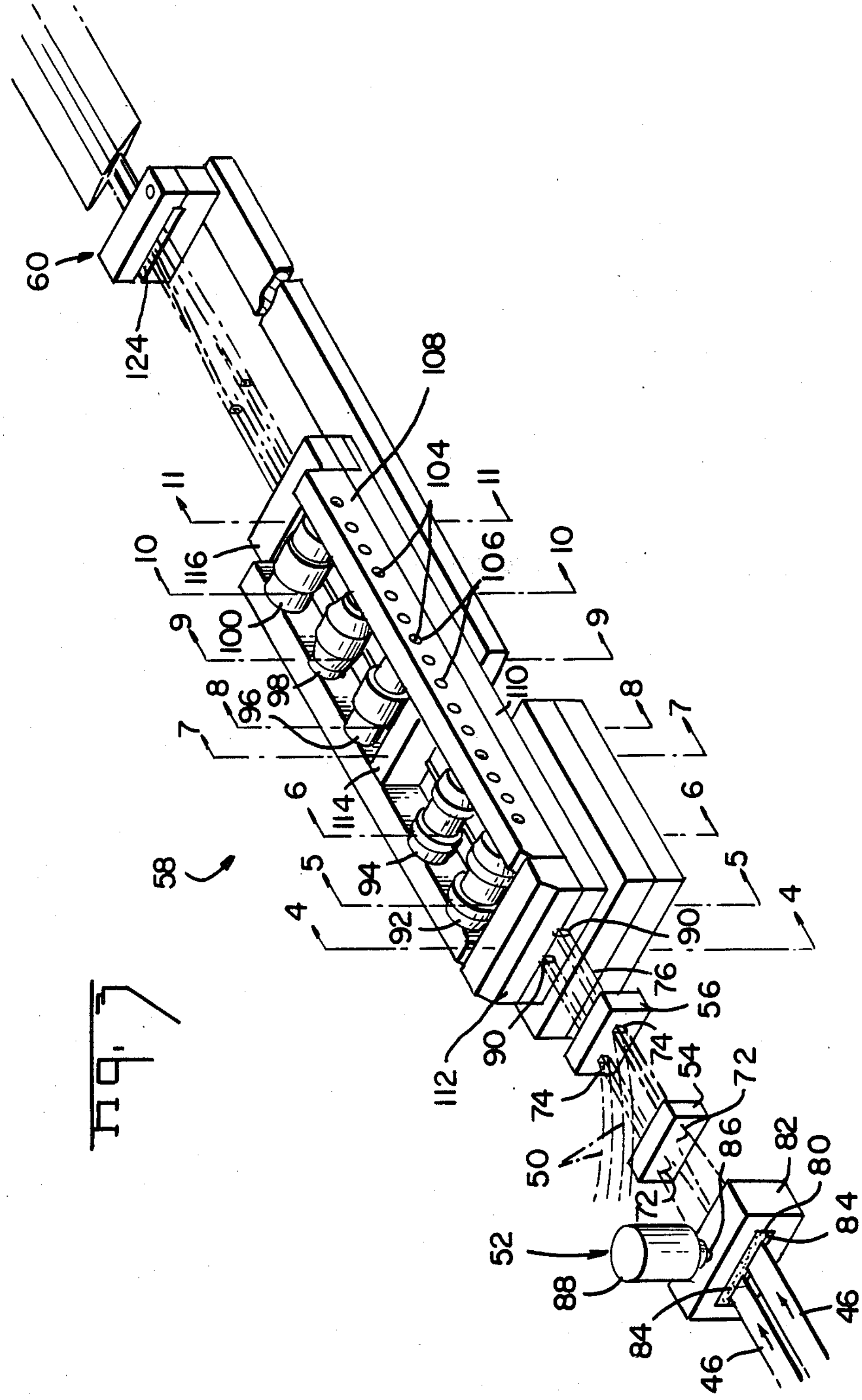
FIG. 3 is an enlarged perspective showing of the portion of the assembly line of FIG. 2 immediately prior to the extrusion press where the conductive shields are formed around the subassemblies.

The pre-extrusion components of the apparatus are more readily seen in FIG. 3 which shows these components enlarged as compared with FIG. 2. The copper foil strips are originally in a flat orientation as they rest and then are fed from the supply reels. Their shaping begins as they are fed through a set of forming-blocks.

The first, or primary, forming-block is provided with two V-shaped slits 72 through which the strip may pass and which will deform the foils into a V-shaped configurations corresponding to the shape of the slits in the first forming-block. The V-shaped foil strips are next fed through a second, or secondary, U-shaped forming block 56 having two openings 74, aligned with the slits of the V-shaped forming block, of such size and shape so as to receive the V-shaped foil and deform it into a U-shaped configuration. The U-shaped openings are sufficiently large so as to also receive the subassemblies which pass through the openings with the foil. It is immediately prior to the U-shaped forming-block that the supply of two conductor subassemblies 50 are brought into contact with the foil strips 46. The flat portions of the subassemblies 76 preferably face upwardly as are the edges 78 of the foil.

The operation of the forming blocks has been found to be improved by lubricating the strips prior to their bending at the forming-blocks. This is achieved at the lubrication assembly. The lubrication assembly includes an aperture 80 in a block 82. The upper and lower surfaces of the aperture are provided with felt pads 84, closely spaced to contact the foil strips passing therebetween. A hole 86 in the top of the block supports a bottle 88 with a supply of lubricant such as mineral oil. The mineral oil of the bottle is in flow communication with the felt pads to continuously moisten the felt pads with the lubricating mineral oil. Moistening of the lower felt pad occurs through the contact between the upper and lower pads between the foil strips and beyond the edges of the foil strips.

The composite subassemblies of U-shaped foils are then fed into apertures 90 of the rolling mill assembly prior to passage to and through the extrusion press 62. The rolling mill assembly includes the plurality, as for example five in number, of precisely machined rollers 92, 94, 96, 98 and 100, preferably fabricated of steel, and located in the path of travel of the composite subassemblies with foils. It is at this station that the edges of the foil are finally formed to constitute the EMI shield totally surrounding the subassemblies and to be surrounded and encased by the third or exterior insulator which forms the body of the cable. Each roller of the rolling mill is mounted for free rotation on shafts 104. The shafts are, in turn, supported by holes 106 in the side plates 108 of the station. The side plates are supported on their bottom surfaces by a base plate 110. Support is also provided frontwardly, centrally and rearwardly by cross brace plates or supports 112, 114 and 116 to add rigidity to the station for maintaining the rollers in precise orientations for accurately bending or shaping the EMI shield from the U-shaped copper foil to the final essentially cylindrical shape totally surrounding the subassembly.

The progression of one foil strip through the rolling mill is shown in FIGS. 4 through 11 which are cross-sectional views of the roller station and foil taken along lines 4—4 through 11—11 of FIG. 3. It should be appreciated and understood that similar but opposite operations are separately simultaneously performed on the adjacent copper strip.

FIG. 4 illustrates a single copper foil strip in U-shaped configuration with a subassembly located therein passing through an opening 90 in the front support plate which is actually formed of an upper and lower section. As can be seen, the foil and subassembly enter the roller station with their curved sections downwardly and with the legs of the U-shaped foil strip and flat face of the subassembly. The hole is shaped and located to help position and align the subassembly and strip accurately through the rolling operation and to and through the extrusion press.

Figure 5:
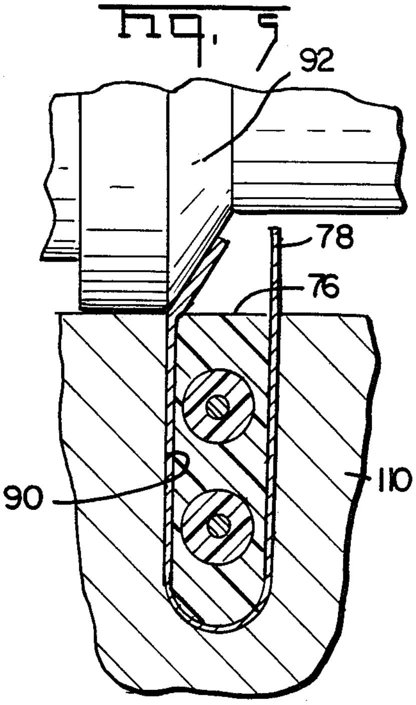
Figure 6:
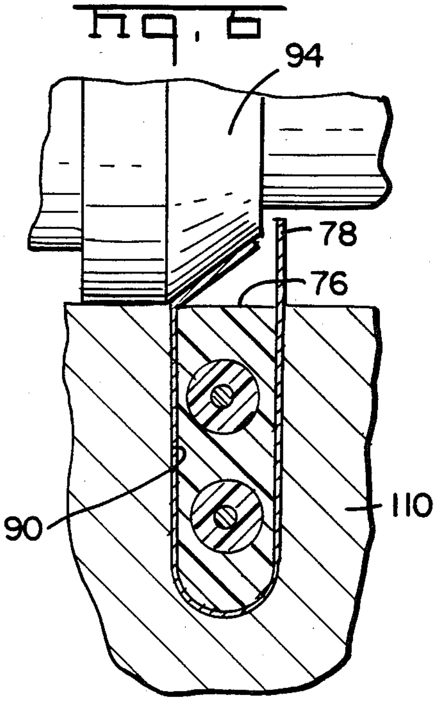
Figure 7:
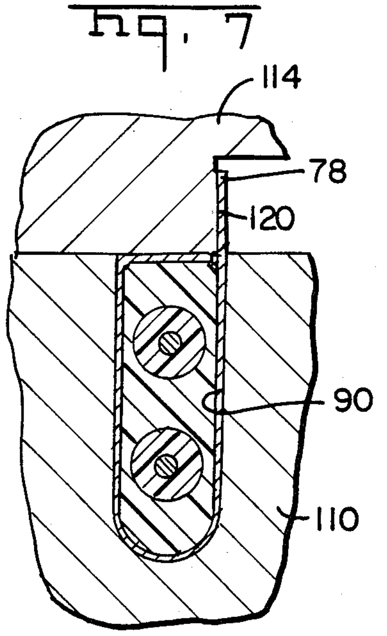
Figure 8:
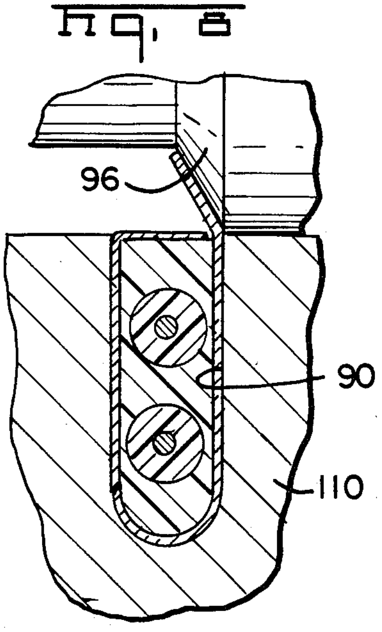
Figure 9:
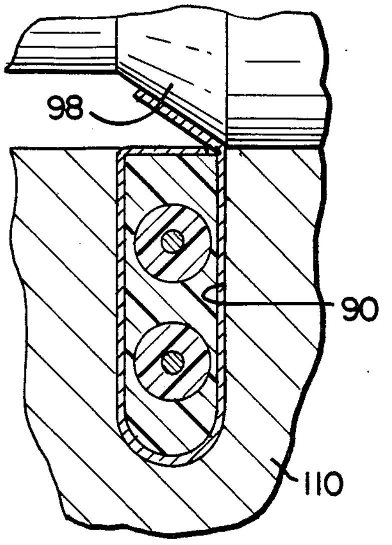
Figure 10:
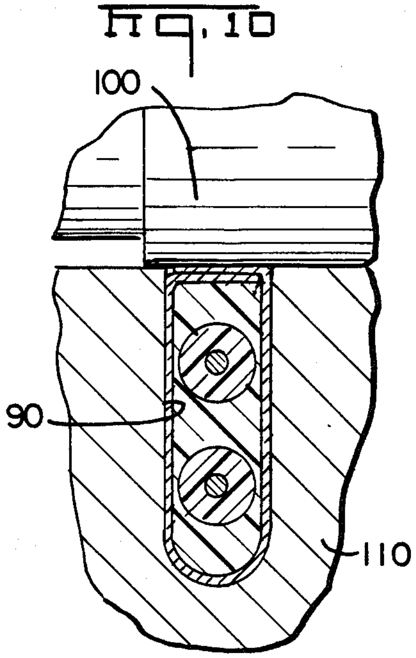
Figure 11:
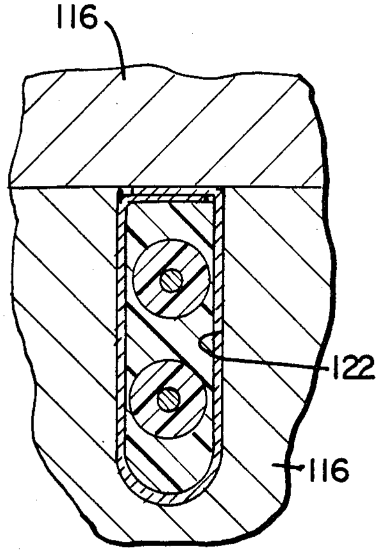

FIGS. 5 and 6 illustrate the rolling action of the two initial rollers 92 and 94 downwardly bending the first edge of the foil. The bending of the strip to the horizontal position in contact with the flat side of the subassembly is completed by passage of the subassembly and strip through an aperture 120 in the central support block 114 as shown in FIG. 7. FIGS. 8 and 9 illustrate the two supplemental rollers 96 and 98 bending the second edge of a copper foil over the first edge of the foil to completely flatten the second edge over the first edge to create the EMI shield totally surrounding the subassembly. The rollers are all machined with precise beveled or angled sections which contact the fed foil strip at a precise location to effect the bending of the foil strip as required.

The subassembly and strip are then fed beneath a non-angled final roller 100 to flattening the outside leg of the foil strip over the inside leg, to ensure its proper operation within the cable. Note FIG. 10.

Before exiting from the rolling station, the EMI shield passes through a hole 122 in the rearward support plate 116. See FIG. 11. At this point an extra degree of compression is provided to the subassembly and to the EMI shield which are now prepared for being fed to and through the extrusion press. The hole 122, by virtue of its precise size and location, assists in maintaining the subassembly and EMI shield on a straight line path to and through the extrusion press.

Between the roller station and the extrusion press, the two EMI shields with their surrounded subassemblies are passed through an opening 124 in an orienting block 60. This arrangement is such as to locate the subassemblies and EMI shields with their flat faces in spaced relationship with such flat faces facing each other. The insulated wires are thus in spaced parallel relationship in a common horizontal plane as are the subassemblies. The distance between the rolling station and orienting block should be sufficiently long so as not to deform the EMI shield.

The two subassemblies encased in copper, the EMI shield, next enter the extrusion press 62 wherein the third, or exterior, insulation layer is formed surrounding the two EMI shields which are, in turn, surrounding the second insulators of the subassemblies. The extrusion press has a die with a profile of the finished cable as can be seen in FIG. 1. The shape of the profile is determined by the shape of the die of the final extrusion die except for the central longitudinal depressions. These depressions are formed upon the cooling of the extruded material due to the larger mass of extruded material therebetween as compared with the mass of extruded material on the adjacent sides thereof.

It is preferred that the subassembly and foil strip be fed through the stations of the apparatus performing the inventive method disclosed herein in an essentially straight line path from at least the last forming-block to a location beyond the extrusion press. In this manner the foil will be stressed as little as possible during fabrication and its strength and integrity maintained.

While the preferred embodiment of the present invention has been disclosed as being carried out on two subassemblies, the method of the present is equally suited for being performed on any number of subassemblies and EMI shields, whether only on a single one or on a plurality.

The take up reel, driven in the conventional manner, pulls or draws the final cable product in their in-line paths of movement through the fabrication machinery and also serves as a storage reel for the cable. An inner segment of EMI shield with a subassembly segment will be found coiled on the interior of the take up reel since the pre-extrusion components of the process must be initially fed through the machinery to the take up reel to effect its pulling operation prior to and immediately following the activation of the extrusion press.

Although the invention has been described in terms of one embodiment and additional extensions of this invention have been discussed, it will be appreciated that the invention is not limited to the precise embodiment disclosed or discussed since other embodiments will be readily apparent to those skilled in the art.

What is claimed is:

1. A method of fabricating a flat electrical cable for transmitting high frequency signals comprising the steps of:

feeding a plurality of conductor subassemblies through a progressive die means, each subassembly containing a pair of separately insulated conductive wires having a surrounding insulating web to hold the separately insulated conductors spaced apart and parallel one with respect to another;

forming an electrically conductive shield around each subassembly by positioning the conductor subassembly in shielding material and folding free ends of the shielding material in overlapping engagement with the subassembly to form a shielded conductor subassembly;

arranging the two shielded conductor subassemblies side-by-side with the overlapped ends of the shielding material facing one another; and extruding an insulator around the shielded subassemblies.

2. The method as set forth in claim 1 and further including the step of:

holding the subassemblies spaced from each other and in parallel alignment as they pass through the extrusion press.

3. The method as set forth in claim 1 and further including the step of:

holding the subassemblies spaced from each other and in an essentially horizontal plane with the wires of the subassemblies also in an essentially horizontal plane.

4. A method of fabricating a low profile cable for transmitting high frequency electrical signals comprising the steps of:

drawing insulated conductors through a first extrusion press to define two conductor subassemblies containing insulated conductive wires with a surrounding and extruded insulating web therearound to hold the separately insulated conductors spaced apart and parallel with respect to one another;

forming an electrically conductive shield around each subassembly by positioning the conductor assembly in U-shaped shielding material and folding free ends of the shielding material in overlapping engagement with the subassembly to form a shielded conductor subassembly;

arranging the two shielded conductor subassemblies side-by-side with the overlapped free ends of the shielding material facing one another; and feeding the shielded conductor subassemblies into a second extrusion press thereby extruding an insulator therearound during their movement through the second extrusion press.

5. A method of fabricating a low profile cable for transmitting high frequency electrical signals comprising the steps of:

feeding two conductor subassemblies into a progressive die means, each subassembly containing a pair of insulated conductive wires embedded in an insulative web such that each pair of conductors are in a spaced apart and parallel relationship with respect to one another;

forming, by means of said progressive die means, an electrically conductive shield around each subassembly by bending flat foil into an essentially U-shaped configuration by pulling the flat foil through an aperture in a forming block means;

sequentially rolling the ends of the U-shaped foil into contact with each other to surround the subassembly by pulling the U-shaped foil through a series of sequential rollers; and extruding insulation around both conductor subassemblies.

6. The method as set forth in claim 5 wherein each subassembly is supported on a separate supply reel and the shield material is supported in flat foil form an additional supply reel means.

7. The method as set forth in claim 5 wherein the finished cable is drawn through the extrusion press by a power driven take up reel.

8. The method as set forth in claim 5 and further including the step of:

forming each shield from a flat foil configuration, to an essentially cylindrical configuration surrounding the subassemblies, prior to passage through the extrusion press.

9. The method as set forth in claim 5 and further including the step of feeding a subassembly to the foil before its passage through the forming-block.

10. The method as set forth in claim 9 wherein the bending is accomplished by pulling the flat foil through a V-shaped aperture in a primary forming-block and then through a U-shaped aperture in a secondary forming block.

11. The method as set forth in claim 9 wherein the U-shaped foil supports a subassembly prior to movement into the sequential rollers with the curved portion of the U-shaped foil and subassembly located facing downwardly and with the ends of the U-shaped foil and a flat surface of the subassembly facing upwardly.

12. The method as set forth in claim 11 wherein the sequential rollers include first rollers to contact and bend one upstanding leg of the U-shaped foil into contact with the flat face of the subassembly and the second rollers then bend the second upstanding leg into contact with the first upstanding leg of the U-shapes foil to thereby completely surround the subassembly.

13. The method as set forth in claim 12 and further including the step of:

rotating the subassembly and shield fed from the sequential rollers about 90 degrees before feeding it to the extruder.

14. The method as set forth in claim 13 wherein the path of travel of the subassembly and foil is essentially a straight line from the forming-blocks to beyond the extruder.

15. The method as set forth in claim 12 and further including the step of applying a lubricant to the foil prior to its passage to the forming-blocks.

16. A method of fabricating a low profile electrical transmission cable, comprising the steps of:

feeding two conductor subassemblies into a progressive die means, each conductor subassembly comprising a pair of conductors embedded in an insulating body, fixedly spaced in a plane and parallel with respect to each other, the body having a flat surface extending transverse to the plane of the conductors;

forming, with said progressive die means, an axially continuous conductive foil shield around each conductor subassembly by overlapping the ends of the foil shield along the body flat surface;

arranging the two shielded conductor subassemblies side-by-side with the overlapping ends of the foil shield facing one another; and extruding insulation around the exterior of the foil shield encapsulating both shielded conductor subassemblies.

17. The method as set forth in claim 16 wherein a plurality of foil shields are simultaneously separately formed around a plurality of conductor subassemblies.

18. The method as set forth in claim 17 wherein the separate conductor subassemblies are oriented with the conductor planes relatively parallel as the foil shields are formed therearound.

19. The method as set forth in claim 18 wherein the conductor subassemblies are reoriented to dispose all of the conductors in the same plane after the foil shields are formed therearound and prior to extrusion of insulation around the foil shields.

* * * * *